United States Patent
Tebo

(10) Patent No.: US 6,299,400 B1
(45) Date of Patent: Oct. 9, 2001

(54) DECK FASTENER, METHOD OF DRIVING AND METHOD OF MANUFACTURE OF FASTENER

(76) Inventor: Glenn J. Tebo, c/o Peace Industries, Ltd., 1100 Hicks Rd., Rolling Meadows, IL (US) 60008-1095

( * ) Notice: Subject to any disclaimer, the term of this patent is extended or adjusted under 35 U.S.C. 154(b) by 0 days.

(21) Appl. No.: 09/605,567

(22) Filed: Jun. 28, 2000

(51) Int. Cl.[7] ................................................ F16B 15/00
(52) U.S. Cl. ..................... 411/459; 411/458; 411/470; 411/920
(58) Field of Search .................................. 411/458, 459, 411/460, 461, 470, 920; 470/37

(56) References Cited

U.S. PATENT DOCUMENTS

| | | | |
|---|---|---|---|
| 2,620,705 | * 12/1952 | Podvinecz et al. | 411/460 |
| 3,416,821 | * 12/1968 | Benno | 411/458 |
| 5,738,473 | 4/1998 | Tebo . | |
| 5,927,923 | 7/1999 | Tebo . | |
| 6,071,054 | 6/2000 | Tebo . | |
| 6,098,865 | 8/2000 | Tebo . | |

OTHER PUBLICATIONS

Drawing of prior art deck fastener used more than one year prior to Jun. 28, 2000.

* cited by examiner

*Primary Examiner*—Neill Wilson
(74) *Attorney, Agent, or Firm*—Wood, Phillips, VanSanten, Clark & Mortimer

(57) ABSTRACT

A deck board fastener has first and second parallel straight prongs for insertion respectively into a deck board and a supporting joist, a crown coplanar with and joining the first and second prongs, a third prong extending from the crown at an angle to the first prong for securing a second deck board to the joist adjacent the first deck board and the crown has a driving surface in the plane of the first and second prongs and at a right angle to the axes of the first and second prongs. The angle between the third prong and the first prong is formed at the juncture of the third prong and the crown.

11 Claims, 2 Drawing Sheets

FIG. 1 PRIOR ART
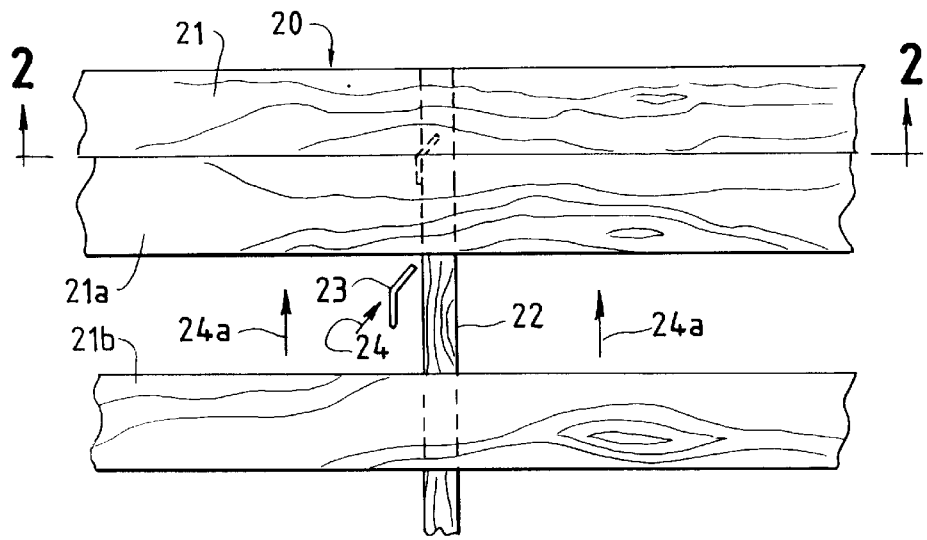
FIG. 2 PRIOR ART
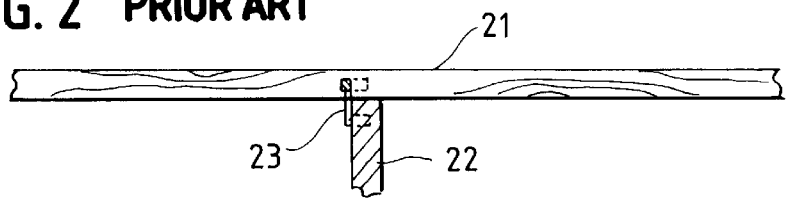
FIG. 3
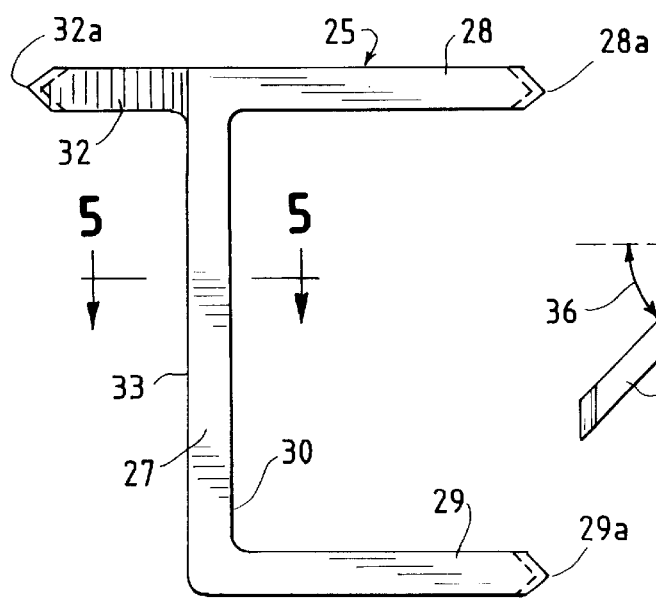
FIG. 4
FIG. 5
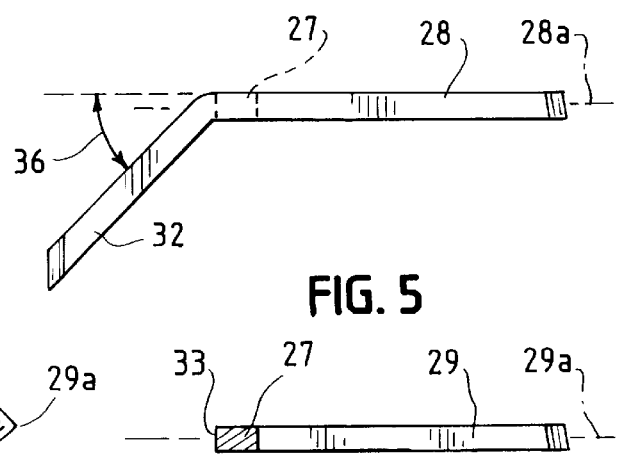

DECK FASTENER, METHOD OF DRIVING AND METHOD OF MANUFACTURE OF FASTENER

This application is concerned with an improved deck board fastener which, when installed, is hidden from the deck surface.

BACKGROUND OF THE INVENTION

My U.S. Pat. Nos. 5,738,473, 5,927,923 and 6,071,054 disclose a deck board fastener in the form of a three prong staple. An improved three prong staple particularly adapted for installation with a fastener feeding and driving tool is disclosed herein.

BRIEF SUMMARY OF THE INVENTION

A principal feature of the improved staple fastener is that it has first and second parallel prongs for insertion respectively into a deck board and a supporting joist, a crown joining the first and second prongs and a third prong extending from the crown at an angle to the first prong for securing another deck board on the joist adjacent the first deck board, the crown having a driving surface in the plane of the parallel prongs.

Another feature is that the driving surface of the crown is at a right angle to the length of the first and second prongs.

A further feature is that the axes of the first and second prongs extend through the driving surface.

Another feature is that the angle of the third prong is at the driving surface edge of the crown.

Yet a further feature is that in driving the staple a driving force is applied to the driving edge of the crown, in the plane of the parallel prongs and a right angle to the driving surface.

Yet another feature is that the staple is manufactured from a flat blank by bending the third prong out of the plane of the crown and first and second prongs along the edge of the crown.

BRIEF DESCRIPTION OF THE DRAWINGS

FIG. 1 is a plan view of a portion of a wood deck illustrating use of the three leg staple fastener;

FIG. 2 is a vertical section taken along line 2—2 of FIG. 1;

FIG. 3 is an enlarged elevation of the staple fastener;

FIG. 4 is a plan view thereof;

FIG. 5 taken along line 5—5 of FIG. 3;

Figure 6:
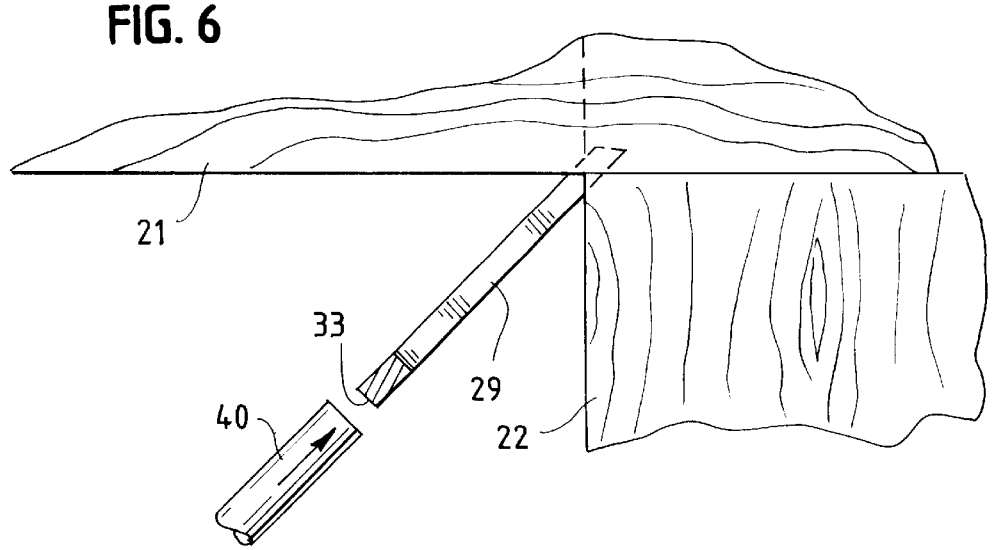
FIG. 6 is a plan view illustrating the staple fastener and a driver.

A wooden deck 20 is typically constructed of deck boards 21, 21a and 21b supported by a plurality of joists, one of which is shown at 22. The three prong staple 23 of my patents is a hidden which secures the deck boards to the joist and to each other. Two prongs of the staple are driven into the side of joist 22 and the edge of deck board 21. The next deck board 21a is then driven onto the third prong of the staple and the process is repeated with deck board 21b as indicated by arrows 24 and 24a. Each edge of the deck boards is secured both to the supporting joist and to the adjacent edge of the next deck board, without the staples being exposed on the deck surface.

The staple 25, FIGS. 3, 4, and 5 differs from the staples of my patents, primarily in the geometry of the prongs and staple driving surface. Staple 25 is a unitary article, preferably of stainless steel, with a uniform thickness. A rectangular crown portion 27 joins two prongs 28, 29 which extend from long edge 30 of the crown portion. Crown portion 27 and parallel prongs 28, 29 are coplanar. Prong 32 extends from the other long edge 33 of crown portion 27 at an angle 36 with respect to prong 28 of the order of 35–55 degrees and preferably 45 degrees, as shown in FIG. 4. Prongs 28, 29 and 32 have sharpened points 28a, 29a and 32a, respectively.

Prongs 28 and 29 of staple 25 are driven into the edge of a deck board, as 21, and joist 22, respectively at an angle with the joist equal to the angle 36, FIG. 6, so that prong 32 is parallel with the joist. The next deck board is then driven onto prong 32 and the process repeated until the deck is completed. Each deck board is supported by several joists. A staple is used at each intersection.

Edge 33 of crown 27 is a driving surface. Staple 25 is preferably installed with a tool (not shown) as disclosed in my application Ser. No. 09/137,012, filed Aug. 20, 1998, U.S. Pat. No. 6,098,865. Crown edge 33 is in the plane defined by prongs 28, 29 and is at a right angle to the axes 28a, 29a of the prongs. A driver 40 impacts driving surface 33 forcing the prong 29 into joist 22 and prong 28 (not shown in FIG. 6) into the edge of deck board 21. The angle between prong 29 and joist 22 is equal to the angle 36 of prong 32 with respect to the plane of prongs 28 and 29. Accordingly, prong 32 is at a right angle to the edge of deck board 21 when the deck board 21 when the deck board is oriented at a right angle to the joist.

Figure 7:
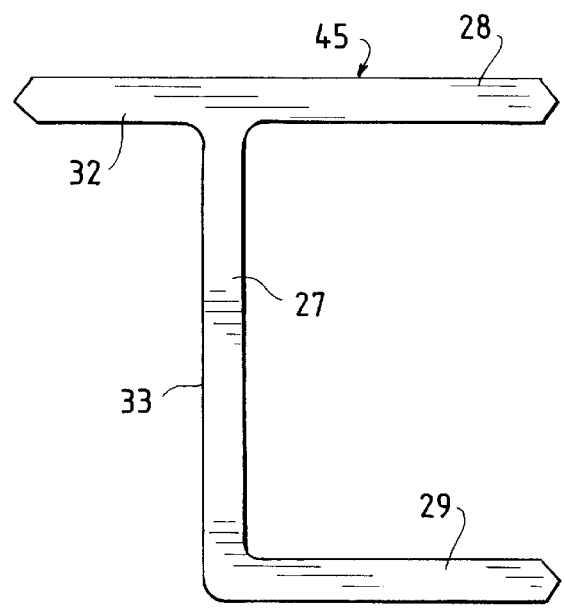
FIG. 7 is an elevation of a blank from which the staple fastener is formed.
Figure 8:
FIG. 8 is an edge view of the blank from below FIG. 7.
Figure 9:
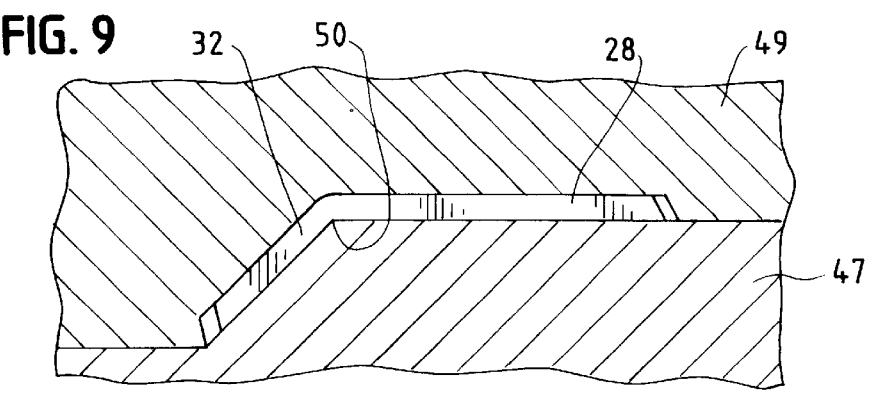
FIG. 9 is a diagram illustrating a stamping die forming the angular orientation of the third prong of the staple fastener and sharpening the points of the prongs.

Staple 25 is preferably fabricated from stainless steel strip. A flat blank 45, FIGS. 7 and 8, is stamped from the strip. The ends of prongs 28, 29 and 32 are pointed, but not sharpened. The blank is then stamped between male and female forming dies 47 and 49, respectively, FIG. 9. The forming operation bends prong 32 to the desired angle and sharpens the points of each of the prongs. The angle between prong 32 and prong 28 is formed at 50, along the driving surface 33 of the staple.

A representative staple has a thickness of 0.090 inch. Crown 27 is 1.5 inch long and 0.125 inch wide. Prongs 28 and 29 are 0.875 inch long and 0.125 inch wide. Prong 32 is 0.562 inch long and 0.125 inch wide.

What is claimed is:

1. A deck fastener having first and second parallel straight prongs for insertion respectively into a deck board and a supporting joist, a crown joining the first and second prongs and a third prong extending from the crown at an angle to said first prong for securing a second deck board to the joist adjacent said first deck board, wherein said crown has a driving surface in the plane of said parallel prongs.

2. The deck fastener of claim 1 wherein said crown is flat.

3. The deck fastener of claim 1 wherein said driving surface is at a right angle to the length of said first and second prongs.

4. The deck fastener of claim 1 wherein said first and second prongs have axes which extend through said driving surface.

5. The deck fastener of claim 2 wherein the first and second prongs and the crown are coplanar.

6. The deck fastener of claim 1 wherein the angle between the third prong and the first prong is at the juncture of the third prong with the crown.

7. The deck fastener of claim 1 wherein the prongs and crown are a unitary body.

8. The deck fastener of claim 1 wherein the crown is a flat, rectangular body portion with the first and second prongs extending from one of the longer edges of the crown and the third prong extending from the other of the longer edges of the crown.

9. The deck fastener of claim 1 wherein the crown is an elongate flat body portion having two side edges and two ends with the first and second prongs extending from each end of the same side of the body portion and the third prong extending from the other side of the crown at an end thereof and forming an angle with the crown and the first prong.

10. The method of driving a deck board retaining staple into a side of a joist and an edge of a deck board resting on said joist and extending at a right angle thereto, comprising:

providing a deck board retaining staple having two parallel prongs joined by a crown with a driving surface in the plane of the parallel prongs and at a right angle to the prong axes, and the third prong extending from the crown at an angle to the plane of said parallel prongs; and applying a driver to said driving surface in the plane of the parallel prongs and at a right angle to the driving surface.

11. The method of manufacture of a deck fastener comprising:

providing a planar blank of strip metal with a rectangular crown body portion, first and second parallel prongs extending from one long edge of the crown body portion at each end thereof and the third prong extending from the other long edge of the crown body portion at an end thereof and aligned with the first prong; and bending the third prong out of the plane of the blank along the edge of the crown where the third prong joins the crown.

* * * * *